US010981279B2

(12) United States Patent
Hayashi

(10) Patent No.: US 10,981,279 B2
(45) Date of Patent: Apr. 20, 2021

(54) AUTONOMOUSLY ACTING ROBOT THAT SEEKS COOLNESS

(71) Applicant: GROOVE X, Inc., Tokyo (JP)

(72) Inventor: Kaname Hayashi, Tokyo (JP)

(73) Assignee: GROOVE X, INC., Tokyo (JP)

(*) Notice: Subject to any disclaimer, the term of this patent is extended or adjusted under 35 U.S.C. 154(b) by 312 days.

(21) Appl. No.: 16/198,768

(22) Filed: Nov. 22, 2018

(65) Prior Publication Data

US 2019/0091874 A1 Mar. 28, 2019

Related U.S. Application Data

(63) Continuation of application No. PCT/JP2017/019140, filed on May 23, 2017.

(30) Foreign Application Priority Data

Jun. 14, 2016 (JP) .............................. JP2016-117616

(51) Int. Cl.
*B25J 19/02* (2006.01)
*B25J 13/08* (2006.01)
*G05D 1/02* (2020.01)
*B25J 9/16* (2006.01)

(52) U.S. Cl.
CPC ........... *B25J 13/087* (2013.01); *B25J 9/1664* (2013.01); *G05D 1/0274* (2013.01); *G05D 2201/0214* (2013.01)

(58) Field of Classification Search
CPC ...... B25J 13/087; B25J 9/1664; B25J 11/001; B25J 9/1694; G05D 1/02; G05D 1/0274; G01K 13/002

USPC ................................ 700/245, 258; 901/1, 11
See application file for complete search history.

(56) References Cited

U.S. PATENT DOCUMENTS

| 6,565,371 B1 | 5/2003 | Watanabe |
| 2002/0052672 A1* | 5/2002 | Osawa ................. G06N 3/008 700/245 |
| 2005/0108660 A1* | 5/2005 | Cheng ................. A61B 5/103 715/863 |

(Continued)

FOREIGN PATENT DOCUMENTS

| JP | H8-266675 A | 10/1996 |
| JP | H11-259129 A | 9/1999 |

(Continued)

OTHER PUBLICATIONS

International Search Report in PCT/JP2017/019140, dated Aug. 8, 2017. 11pp.

(Continued)

*Primary Examiner* — Dalena Tran
(74) *Attorney, Agent, or Firm* — Hauptman Ham, LLP

(57) ABSTRACT

A robot sets a cool point as a movement target point, and specifies route coordinates and coordinates for reaching the cool point. The robot moves to the cool point via the route, which is of a lower temperature. The robot searches for the cool point by referring to a temperature map showing a temperature distribution in a range in which the robot can move. Also, the robot compiles and updates the temperature map by measuring peripheral temperature as appropriate using a thermometer incorporated in the robot.

20 Claims, 8 Drawing Sheets

(56) References Cited

U.S. PATENT DOCUMENTS

| | | | |
|---|---|---|---|
| 2005/0171640 A1* | 8/2005 | Sabe | A63H 11/00 700/245 |
| 2006/0128261 A1 | 6/2006 | Kawabe et al. | |
| 2007/0192910 A1* | 8/2007 | Vu | B25J 19/06 700/245 |

FOREIGN PATENT DOCUMENTS

| | | |
|---|---|---|
| JP | 2000-323219 A | 11/2000 |
| JP | 2003-275976 A | 9/2003 |
| JP | 2005-17793 A | 1/2005 |
| JP | 2005-25501 A | 1/2005 |
| JP | 2006-167834 A | 6/2006 |
| JP | 2007-61962 A | 3/2007 |
| JP | 2010-230392 A | 10/2010 |
| JP | 2014-22377 A | 2/2014 |

OTHER PUBLICATIONS

Office Action in JP Application No. 2017-557017, dated Jan. 30, 2018. 5pp.
Office Action in JP Application No. 2018-067155, dated Jun. 12, 2018. 4pp.
Written Opinion of the ISA in PCT/JP2017/019140, dated Aug. 8, 2017, 24pp.

* cited by examiner

AUTONOMOUSLY ACTING ROBOT THAT SEEKS COOLNESS

RELATED APPLICATIONS

The present application is a continuation of International Application No. PCT/JP2017/019140, filed May 23, 2017, which claims priority from Japanese Application No. 2016-117616, filed Jun. 14, 2016, the disclosures of which applications are hereby incorporated by reference herein in their entirety.

TECHNICAL FIELD

The present disclosure relates to a robot that autonomously selects an action in accordance with an internal state or an external environment.

BACKGROUND ART

A human acquires various items of information from an external environment via sensory organs, and selects an action. There are times when an action is consciously selected, and times when an action is subconsciously selected. A repeated action becomes a subconscious action in time, and a new action remains in a consciousness region.

A human believes that he or she has a will to freely select an action by him or herself, that is, a free will. That a human feels emotions of affection or enmity toward another person is because he or she believes that the other person also has a free will. A person who has free will, or at least an existence that can be supposed to have a free will, is also an existence that eases a person's sadness.

A reason a human keeps a pet is that the pet provides solace, rather than whether or not the pet is useful to the human. Exactly because a pet is an existence that to a greater or lesser degree creates an impression of having a free will, the pet can become a good companion to a human.

Meanwhile, for various reasons such as not being able to secure sufficient time to look after a pet, not having a living environment in which a pet can be kept, having an allergy, or hating the thought of being parted by death, there are many people who give up on keeping a pet. A robot that performs the role of a pet may provide people who cannot keep a pet with the kind of solace that a pet provides (refer to JP-A-2000-323219)

SUMMARY OF THE INVENTION

Problems to be Solved by the Invention

Although robot technology has advanced swiftly in recent years, the technology has not produced a presence as a pet-like companion. The inventors believe that this is because people do not consider a robot as having a free will. A human, by observing an action such that it can only be thought that a pet has a free will, feels the existence of a free will in the pet, empathizes with the pet, and is given solace by the pet.

The inventors believe that if there were a robot that can emulate a human-like or animal-like action, in other words, a robot that can autonomously select a human-like or animal-like action, empathy toward the robot could be greatly increased.

The invention, having been completed based on a recognition of the heretofore described issue, has a main object of providing behavior control technology that expresses animal-like behavior characteristics of a robot, and in particular, behavior characteristics of seeking a cool place.

Solution to Problem

An autonomously acting robot in one aspect of the invention includes an operation determining unit that specifies a direction of movement, and a drive mechanism that executes the movement specified by the operation determining unit.

The operation determining unit specifies a cool point, which is a point with a temperature lower than that of a current point, as a movement target point.

An autonomously acting robot in another aspect of the invention includes an operation determining unit that specifies a direction of movement, a drive mechanism that executes the movement specified by the operation determining unit, and a recognizing unit that detects a cooling device or a controller of the cooling device.

The operation determining unit sets a direction in which the cooling device or the controller exists as the direction of movement when an internal temperature of the robot reaches a predetermined value or higher, or when the internal temperature is predicted to reach the predetermined value or higher.

An autonomously acting robot in another aspect of the invention includes an operation determining unit that specifies a direction of movement, a drive mechanism that executes the movement specified by the operation determining unit, and a cooling mechanism that causes a rotational speed of a fan to change based on an internal temperature.

The operation determining unit sets the direction of movement in a direction away from a user when the rotational speed of the fan reaches a predetermined value or greater, or when the rotational speed of the fan is predicted to reach the predetermined value or greater.

An autonomously acting robot in another aspect of the invention includes an operation determining unit that specifies a direction of movement, a drive mechanism that executes the movement specified by the operation determining unit, and a cooling mechanism that causes a rotational speed of a fan to change based on an internal temperature.

The cooling mechanism sets an upper limit value of the rotational speed of the fan to be lower when a user exists within a predetermined range than when the user does not exist.

An autonomously acting robot in another aspect of the invention includes an operation determining unit that specifies a direction of movement, a drive mechanism that executes the movement specified by the operation determining unit, and a body temperature detection unit that detects a body temperature of a user.

The operation determining unit instructs the drive mechanism to execute a predetermined motion for leading the user to a cool point when the body temperature of the user is a predetermined value or higher.

Effect of the Invention

According to embodiments of the invention, empathy toward a robot is easily increased.

DESCRIPTION OF EMBODIMENTS

Detailed Description of the Embodiment of the Invention

Figure 1A:
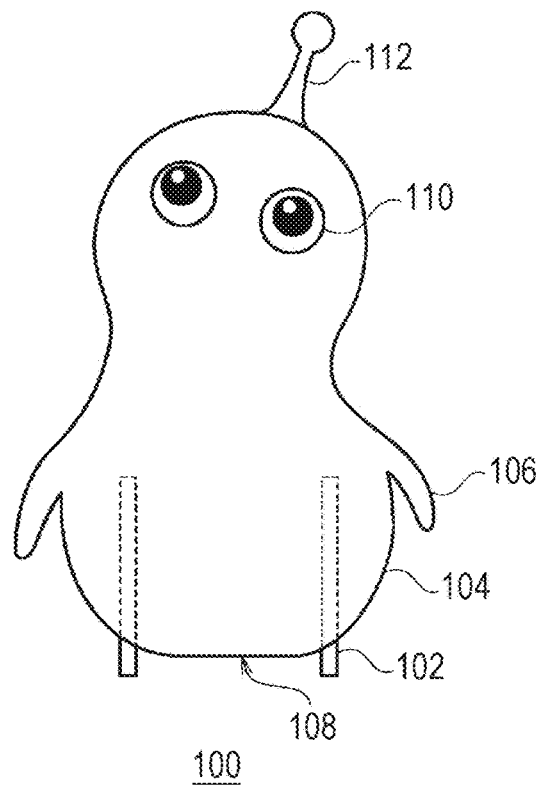
FIG. 1A is a front external view of a robot.
Figure 1B:
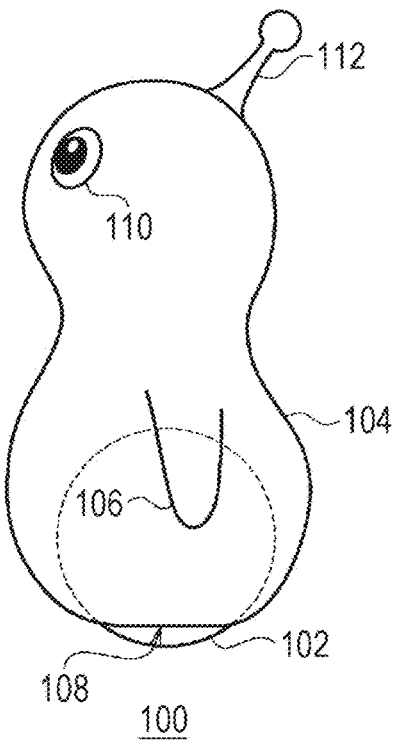
FIG. 1B is a side external view of the robot.

FIG. 1A is a front external view of a robot 100. FIG. 1B is a side external view of the robot 100.

The robot 100 in at least one embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

With indoor action as a precondition, the robot 100 of at least one embodiment has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and is formed of a soft material having elasticity, such as urethane, rubber, or resin. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less. In at least one embodiment, the total weight of the robot 100 is 10 kilograms or less. In at least one embodiment the total weight of the robot 100 is 5 kilograms or less. A majority of babies start to walk by themselves 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk unassisted.

An average weight of a baby less than 2 months after birth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is 1.2 meters or less. In at least one embodiment, the height of the robot 100 is 0.7 meters or less.

Being able to be held is a concept of the robot 100 in at least one embodiment.

The robot 100 moves using a wheel 102. A rotational speed and a direction of rotation of two of the wheel 102 can be individually controlled. Also, the wheel 102 can also be slid upward in an interior of the body 104 of the robot 100, and completely stored in the body 104. A greater portion of the wheel 102 is hidden by the body 104 when traveling too, but when the wheel 102 is completely stored in the body 104, the robot 100 is in a state of being unable to move (hereafter called a "sitting state"). In the sitting state, a flat seating face 108 is in contact with a floor surface.

The robot 100 has two arms 106. The arms 106 do not have a function of gripping an object. The arms 106 can perform simple actions such as raising, waving, and oscillating. The two arms 106 can also be controlled individually.

A camera is incorporated in an eye 110. The eye 110 is also capable of an image display using a liquid crystal element or an organic EL element. In addition to the camera incorporated in the eye 110, various sensors, such as a highly directional microphone or an ultrasonic sensor, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112.

Figure 2:
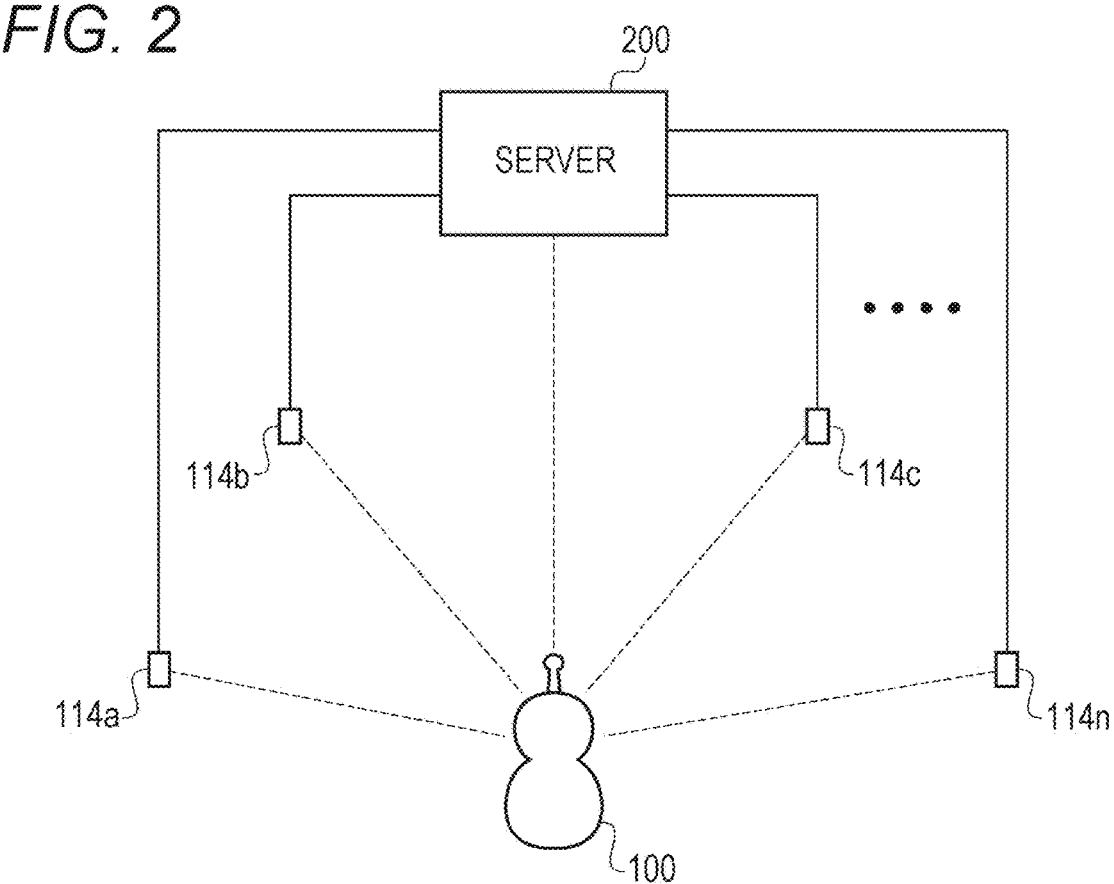
FIG. 2 is a configuration diagram of a robot system.

FIG. 2 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in at least one embodiment correspond one-to-one. The server 200 determines a basic action of the robot 100 based on information obtained from the sensors incorporated in the robot 100 and the multiple of external sensors 114.

The external sensor 114 is for reinforcing sensory components of the robot 100, and the server 200 is for reinforcing processing power of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits positional coordinates to the server 200 may also be adopted.

Figure 3:
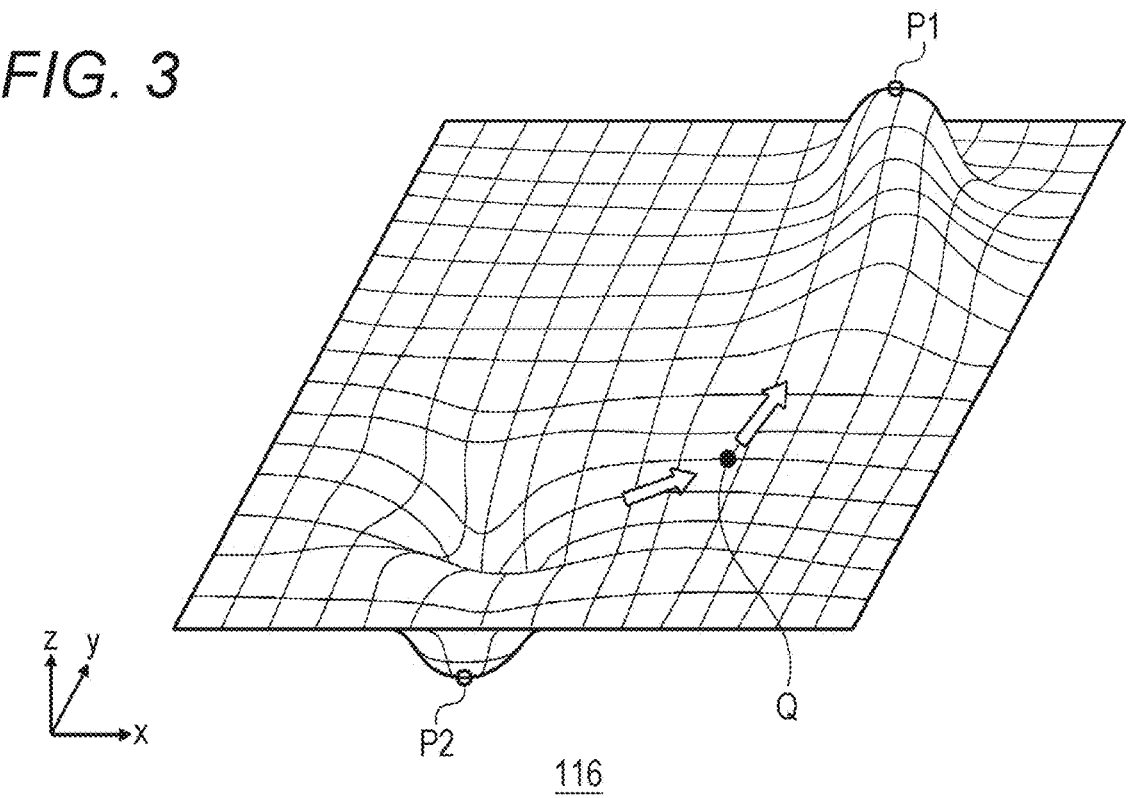
FIG. 3 is a schematic view of an emotion map.

FIG. 3 is a schematic view of an emotion map 116.

The emotion map 116 is a data table stored in the server 200. The robot 100 selects an action in accordance with the emotion map 116. The emotion map 116 shown in FIG. 3 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116 of FIG. 3, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past.

A definition of what kind of place the robot 100 favors is arbitrary, but the favored place is generally a place that is favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but the disliked place is generally a place feared by small children, or by small animals such as dogs or cats, is set as a disliked point.

A coordinate Q indicates a current position of the robot 100. The server 200 identifies positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the wheel 102, thereby identifying the current position, or may identify the current position based on an image obtained from the camera.

When the emotion map 116 shown in FIG. 3 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out an action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 3. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a sadness emotion parameter is increasing, a weighting coefficient of an action map that evaluates places in which the robot 100 feels at ease may be set high, and the value of this emotion parameter reduced by the robot 100 reaching a target point. In the same way, when a value of a parameter indicating a sense of boredom is increasing, a weighting coefficient of an action map that evaluates places in which curiosity is satisfied is set high.

Figure 4:
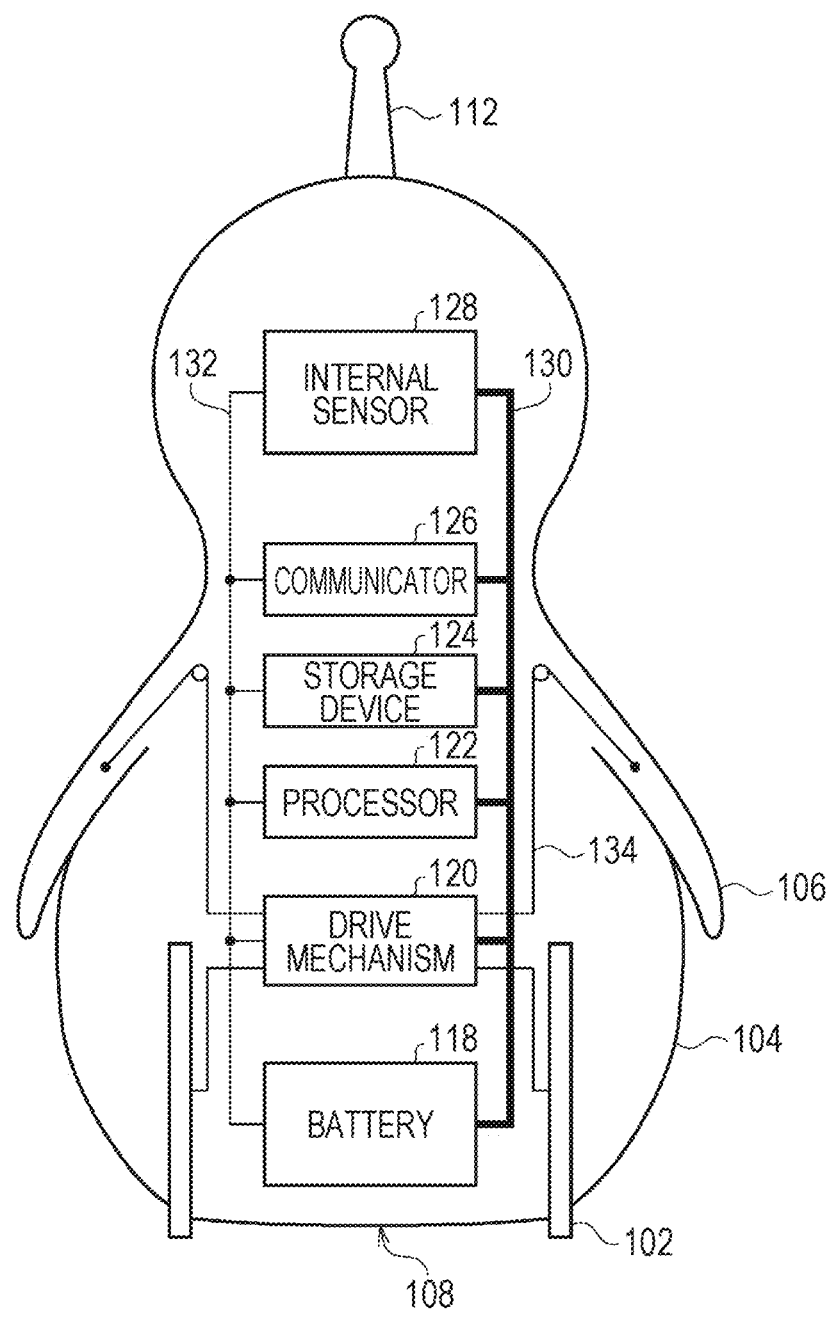
FIG. 4 is a hardware configuration diagram of the robot.

FIG. 4 is a hardware configuration diagram of the robot 100.

The robot 100 includes an internal sensor 128, a communicator 126, a storage device 124, a processor 122, a drive mechanism 120, and a battery 118. The units are connected to each other by a power line 130 and a signal line 132. The battery 118 supplies power to each unit via the power line 130. Each unit transmits and receives a control signal via the signal line 132. The battery 118 is a rechargeable battery such as a lithium ion rechargeable battery, and is a power source of the robot 100.

The internal sensor 128 is a collection of various kinds of sensor incorporated in the robot 100. Specifically, the internal sensor 128 is a camera, a highly directional microphone, an infrared sensor, a thermosensor, a touch sensor, an acceleration sensor, a smell sensor, and the like. The smell sensor is an already known sensor that applies a principle that electrical resistance changes in accordance with an adsorption of a molecule forming a source of a smell. The smell sensor classifies various smells into multiple kinds of category (hereafter called "smell categories").

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls various mechanisms, such as the wheels 102 and the arms 106.

In addition to this, an indicator, a speaker, and the like are also mounted in the robot 100.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheel 102 and the arm 106. The drive mechanism 120 changes a direction of movement and a movement speed of the robot 100 by changing the rotational speed and the direction of rotation of each of the two wheels 102. Also, the drive mechanism 120 can also raise and lower the wheel 102. When the wheel 102 rises, the wheel 102 is completely stored in the body 104, and the robot 100 comes into contact with a floor surface via the seating face 108, taking on the sitting state.

The arm 106 can be lifted up by the drive mechanism 120 pulling the arm 106 via a wire 134. A gesture like an arm waving can also be performed by the arm 106 being caused to oscillate. A more complex gesture can also be represented by a large number of the wire 134 being utilized. That is, as the number of wires 134 in arm 106 complexity of possible gestures by arm 106 increases.

Figure 5:
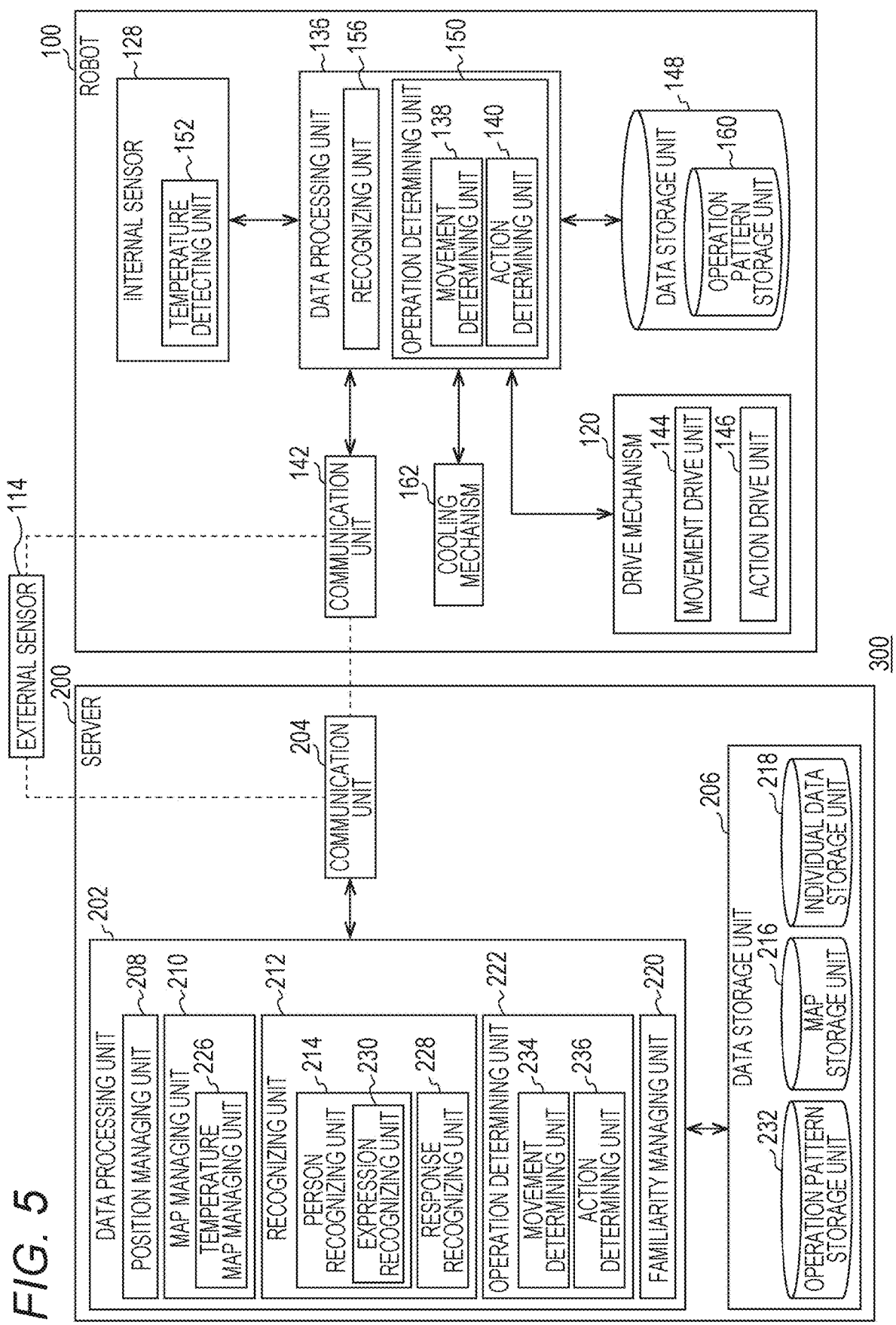
FIG. 5 is a functional block diagram of the robot system.

FIG. 5 is a functional block diagram of a robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes an operation pattern storage unit 232, a map storage unit 216, and an individual data storage unit 218. The operation pattern storage unit 232 correlates ID of operation patterns (hereafter called "operation ID") expressing each kind of gesture of the robot 100 and selection conditions thereof. The map storage unit 216 stores a multiple of action maps. The individual data storage unit 218 stores information on a user, and in particular, on an owner. Specifically, the individual data storage unit 218 stores various kinds of parameter, such as familiarity toward a user, and physical characteristics and behavioral characteristics of a user. The individual data storage unit 218 may also store attribute information such as age and gender.

The robot 100 identifies a user based on the physical characteristics and the behavioral characteristics of the user. The robot 100 constantly captures a periphery using the incorporated camera. Further, the robot 100 extracts the physical characteristics and the behavioral characteristics of a person appearing in an image. The physical characteristics may be visual characteristics inherent to a body, such as a height, clothes worn by choice, a presence or absence of spectacles, a skin gloss, a hair color, or an ear size, or may also include other characteristics such as an average body temperature, a smell, or a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad.

The robot 100 clusters users appearing with a high frequency as "owners" based on physical characteristics and behavioral characteristics obtained from a large amount of image information and other sensing information.

Although a method of identifying a user from user ID is simple and reliable, the user having a device that can provide user ID is a precondition. Meanwhile, the method of identifying a user from physical characteristics or behavioral characteristics is such that an image recognition process is weighty, but there is an advantage in that even a user who does not have a mobile device can be identified. One of the two methods may be employed alone, or user identification may be carried out using the two methods together in a complementary way.

In at least one embodiment, users are clustered based on physical characteristics and behavioral characteristics, and a user is identified using deep learning (a multilayer neural network). Details will be described hereafter.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation determining unit 222, and a familiarity managing unit 220.

The position managing unit 208 identifies the positional coordinates of the robot 100 using the method described using FIG. 2. The position managing unit 208 may also track positional coordinates of a user in real time.

The map managing unit 210 changes the parameters of each coordinate in the multiple of action maps using the method described in connection with FIG. 3. A temperature map managing unit 226, which is one portion of functions of the map managing unit 210, manages a temperature map, which is one kind of action map. The temperature map will be described hereafter.

The map managing unit 210 may select one of the multiple of action maps, or may take a weighted average of the z values of the multiple of action maps. For example, the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214 and a response recognizing unit 228. The person recognizing unit 214 recognizes a person from an image filmed by the camera incorporated in the robot 100, and extracts the physical characteristics and behavioral characteristics of the person. Further, based on the physical characteristic information and the behavioral characteristic information registered in the individual data storage unit 218, the person recognizing unit 214 determines what person, such as a father, a mother, or an eldest son, the user filmed, that is, the user the robot 100 is looking at, corresponds to. The person recognizing unit 214 includes an expression recognizing unit 230. The person recognizing unit 214 includes an expression recognizing unit 230. The expression recognizing unit 230 infers an emotion of a user using image recognition of an expression of the user.

In addition to a person, the person recognizing unit 214 also, for example, extracts characteristics of a cat or a dog that is a pet. Hereafter, a description will be given assuming that not only a person but also a pet is included as a user or an owner.

The response recognizing unit 228 recognizes various responsive actions performed with respect to the robot 100, and classifies the actions as pleasant or unpleasant actions. The response recognizing unit 228 also recognizes a responsive action of an owner with respect to an action of the robot 100, thereby classifying the responsive action as a positive or negative response.

Pleasant and unpleasant actions are distinguished depending on whether a responsive action of a user is pleasing or unpleasant for an animal. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation determining unit 222 of the server 200 determines an operation (movement and gesture) of the robot 100 in cooperation with an operation determining unit 150 of the robot 100. The operation determining unit 222 includes a movement determining unit 234 and an action determining unit 236. The movement determining unit 234 compiles a movement target point of the robot 100, and a movement route for the movement target point, based on an action map selection by the map managing unit 210. The movement determining unit 234 compiles a multiple of movement routes, and having done so, may select any one of the movement routes. The action determining unit 236 selects a gesture of the robot 100 from the multiple of operation patterns of the operation pattern storage unit 232.

The familiarity managing unit 220 manages familiarity for each user. As heretofore described, familiarity is registered as one portion of individual data in the individual data storage unit 218. Details of familiarity management will be described hereafter.

Robot 100

The robot 100 includes a communication unit 142, a data processing unit 136, a data storing unit 148, a drive mechanism 120, an internal sensor 128, and a cooling mechanism 162.

The communication unit 142 corresponds to the communicator 126 (refer to FIG. 4), and manages a process of communicating with the external sensor 114 and the server 200. The data storing unit 148 stores various kinds of data. The data storing unit 148 corresponds to the storage device 124 (refer to FIG. 4). The data processing unit 136 executes various kinds of process based on data acquired by the communication unit 142 and data stored in the data storing unit 148. The data processing unit 136 corresponds to the processor 122 and a computer program executed by the processor 122. The data processing unit 136 also functions as an interface of the communication unit 142, the internal sensor 128, the drive mechanism 120, and the data storing unit 148.

The internal sensor 128 includes a temperature detection unit 152.

The temperature detection unit 152 measures a body temperature of a user and a peripheral temperature. The temperature detection unit 152 includes a non-contact temperature sensor such as a radiation thermometer or thermography, and a contact temperature sensor such as a thermistor, a resistance temperature detector, a thermocouple, or an IC temperature sensor.

The cooling mechanism 162 includes a heatsink and a fan. The fan of the cooling mechanism 162 takes in external air, and discharges heat trapped in an interior. An operating level of the cooling mechanism 162 can be regulated by the rotational speed of the fan being regulated in accordance with a temperature of the interior of the robot 100.

The data storage unit 148 includes an operation pattern storage unit 160 that defines various kinds of operation of the robot 100.

Operation ID and an operation selection condition are correlated in the operation pattern storage unit 160 of the server 200. For example, a selection probability of an operation pattern A when an unpleasant action is detected is recorded correlated to the operation ID. The action determining unit 236 of the server 200 selects an operation pattern based on this kind of selection condition.

Operation ID, and a method of controlling various kinds of actuator for realizing an operation thereof, are defined in the operation pattern storage unit 160 of the robot 100. Specifically, an operating timing, an operating time, an operating direction, and the like, of the various kinds of actuator (the drive mechanism 120) are defined chronologically for each operating pattern in order to express various gestures such as housing the wheel 102 and sitting down, raising the arm 106, causing the robot 100 to perform a rotating action by causing the two wheels 102 to rotate in reverse, or by causing only one wheel 102 to rotate, shaking by causing the wheel 102 to rotate with the wheel 102 in a housed state, and stopping once and looking back when moving away from a user.

The data processing unit 136 includes a recognizing unit 156 and the operation determining unit 150. The operation determining unit 150 of the robot 100 decides an operation of the robot 100 in cooperation with the operation determining unit 222 of the server 200. The operation determining unit 150 includes a movement determining unit 138 and an action determining unit 140.

The drive mechanism 120 includes a movement drive unit 144 and an action drive unit 146. The movement determining unit 138 decides a direction of movement of the robot 100 together with the movement determining unit 234 of the server 200. A movement based on an action map may be determined by the server 200, and an instantaneous movement such as avoiding an obstacle may be determined by the movement determining unit 138 of the robot 100. The movement drive unit 144 causes the robot 100 to head toward a target point by driving the wheel 102 in accordance with an instruction from the movement determining unit 138.

Although an action map decides the main element of the direction of movement of the robot 100, the robot 100 can also carry out an action corresponding to familiarity.

Operation ID selected by the action determining unit 236 of the server 200 is relayed to the robot 100, and the action determining unit 140 of the robot 100 instructs the action drive unit 146 to execute an operation pattern corresponding to the operation ID.

One portion of complex operation patterns may be determined by the server 200, and other operation patterns may be determined by the robot 100. Alternatively, a basic operation pattern may be determined by the server 200, and an additional operation pattern may be determined by the robot 100. It is sufficient that how operation pattern determining processes are shared between the server 200 and the robot 100 is designed in accordance with specifications of the robot system 300.

The action determining unit 140 can also perform a gesture of holding up both arms 106 as a gesture asking for "a hug" when a user with a high degree of familiarity is nearby, and can also perform a gesture of no longer wanting to be hugged by causing the wheel 102 to rotate in reverse in a housed state when bored of the "hug". The action drive unit 146 causes the robot 100 to perform various gestures by driving the wheel 102 and the arm 106 in accordance with an instruction from the action determining unit 140.

The recognizing unit 156 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly films an exterior angle using the incorporated camera (the internal sensor 128), and detects a user that is a moving object such as a person or a pet. Characteristics thereof are transmitted to the server 200, and the person recognizing unit 214 of the server 200 extracts the physical characteristics of the moving object. Also, the recognizing unit 156 also detects a smell of the user and a voice of the user. Smell and sound (voice) are classified into multiple kinds using an already known method. Also, a temperature when touched can also be detected using the temperature detection unit 152.

When a strong force is applied to the robot 100, the recognizing unit 156 recognizes this using an incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of confronting the robot 100 speaks in a specific volume region and a specific frequency band, the response recognizing unit 228 of the server 200 recognizes that a "speaking action" has been performed with respect to the robot 100. Also, when a temperature in the region of body temperature is detected, the response recognizing unit 228 of the server 200 recognizes that a "touching action" has been performed by a user, and when upward acceleration is detected in a state in which touching is recognized, the response recognizing unit 228 of the server 200 recognizes that a "hug" has been performed. Physical contact when a user raises the body 104 may also be sensed, and a hug may also be recognized by a load acting on the wheel 102 decreasing.

In this way, the response recognizing unit 228 of the server 200 recognizes various kinds of response by a user toward the robot 100. "Pleasant" or "unpleasant", and "positive" or "negative", are correlated to one portion of typical responsive actions among these various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

A series of recognition processes including detecting, analyzing, and determining may be carried out by the recognizing unit 212 of the server 200 alone, or carried out by the recognizing unit 156 of the robot 100 alone, or the two may execute the recognition processes while dividing roles.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 may change the z value of the point at which the pleasant or unpleasant action has been carried out on an action map that represents "affection toward a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

The robot 100 regularly carries out image filming, and the person recognizing unit 214 recognizes a moving object from the images, and extracts characteristics of the moving object. When a moving object is detected, physical characteristics and behavioral characteristics are also extracted from the smell sensor, the incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having white hair, being tall, being plump, being suntanned, or being on a sofa.

When a moving object (user) having a beard is often active early in the morning (gets up early) and rarely wears red clothing, a first profile that is a cluster (user) that gets up early, has a beard, and does not often wear red clothing is created. Meanwhile, when a moving object wearing spectacles often wears a skirt, but the moving object does not have a beard, a second profile that is a cluster (user) that wears spectacles and wears a skirt, but definitely does not have a beard, is created.

Although the above is a simple example, the first profile corresponding to a father and the second profile corresponding to a mother are formed using the heretofore described method, and the robot 100 recognizes that there are at least two users (owners) in this house.

Note that the robot 100 does not need to recognize that the first profile is the "father". In all cases, it is sufficient that the robot 100 can recognize a figure that is "a cluster that has a beard, often gets up early, and hardly ever wears red clothing".

It is assumed that the robot 100 newly recognizes a moving object (user) in a state in which this kind of cluster analysis is completed.

At this time, the person recognizing unit 214 of the server 200 extracts characteristics from sensing information of an image or the like obtained from the robot 100, and determines which cluster a moving object near the robot 100 corresponds to using deep learning (a multilayer neural network). For example, when a moving object that has a beard is detected, the probability of the moving object being the father is high. When the moving object is active early in the morning, it is still more certain that the moving object corresponds to the father. Meanwhile, when a moving object that wears spectacles is detected, there is a possibility of the moving object being the mother. When the moving object has a beard, the moving object is neither the mother nor the father, because of which the person recognizing unit 214 determines that the moving object is a new person who has not been cluster analyzed.

Formation of a cluster by characteristic extraction (cluster analysis) and application to a cluster accompanying characteristic extraction (deep learning) may be executed concurrently.

Familiarity toward a moving object (user) changes in accordance with how the robot 100 is treated by the user.

The familiarity managing unit 220 increases or reduces familiarity toward each clustered user. Familiarity mainly changes in accordance with (1) detection (visual recognition), (2) physical contact, and (3) speaking.

1. Detection

When a small child is detected in an image filmed by the robot 100, the small child is "visually recognized" by the robot 100. More specifically, when it is determined that the characteristics of the detected moving object correspond with the cluster (profile) of the small child, using deep learning based on characteristic information obtained from the filmed image and other characteristic information obtained from the smell sensor and the like when filming, it is determined that there is visual recognition. When it is determined that there is visual recognition, the familiarity managing unit 220 increases the familiarity of the small child. The more frequently a user is detected, the more liable the familiarity is to increase.

According to this kind of control method, the robot 100 emulates animal-like behavior in being more liable to feel a sense of closeness toward a person frequently met.

Not being limited to simple detection, familiarity may also increase when "eyes meet". The recognizing unit 156 of the robot 100 may recognize a facial image of a confronting user, recognize a line of sight from the facial image, and recognize that "eyes have met" when the time for which the line of sight is directed toward the robot 100 is a predetermined time or greater.

2. Physical Contact

When the robot 100 visually recognizes a user, and detects a touch (physical contact) from the user, it is determined that interest in the robot 100 has been shown by the user, and familiarity increases. For example, when the robot 100 is touched by the mother, the familiarity managing unit 220 increases the familiarity of the mother. The robot 100 may detect a touching of the robot 100 by an outer shell being covered with a piezoelectric fabric. Touching may also be detected by the body temperature of the user being detected by the temperature sensor. When the robot 100 detects a hug, familiarity may be considerably increased on the basis that strong affection toward the robot 100 has been shown.

Meanwhile, when the robot 100 detects a violent action such as being kicked, being hit, or having the horn 112 grasped, the familiarity managing unit 220 reduces familiarity. For example, when the robot 100 is thrown by the small child, the familiarity managing unit 220 considerably reduces familiarity with respect to the small child.

According to this kind of control method, the robot 100 emulates animal-like behavior in being more liable to feel a sense of closeness toward a person who touches the robot 100 gently, but to dislike a violent person.

3. Speaking

Familiarity is also changed when the robot 100 detects speech directed toward the robot 100. For example, familiarity is increased when the robot 100 detects the name of the robot 100 or an affectionate term in a predetermined volume range. Typical terminological patterns such as "you're cute", "you're funny", or "come here" may be registered in advance as affectionate terms, and whether or not a term is an affectionate term may be determined using speech recognition. Meanwhile, familiarity may be reduced when the robot 100 is spoken to at a high volume exceeding a normal volume range. For example, familiarity is reduced when the robot 100 is scolded in a loud voice, or when surprised.

Also, familiarity may be reduced when an abusive term is directed at the robot 100. Typical terminological patterns such as "stop it", "stay away", "get away", or "idiot" may be registered in advance as abusive terms, and whether or not a term is an abusive term may be determined using speech recognition.

The name of the robot 100 may be registered in advance by a user. Alternatively, the robot 100 may recognize a term used with particular frequency among various terms directed at the robot 100 as being the name of the robot 100. In this case, terms generally liable to be used frequently, such as "hey" and "come here", may be eliminated from candidates for name recognition.

According to the heretofore described control method, the robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of outside environment information detected by the sensors (visual, tactile, and aural).

The familiarity managing unit 220 reduces familiarity with the passing of time. For example, the familiarity managing unit 220 may reduce the familiarity of all users by 1 each every 10 minutes. When a user does not continue to be involved with the robot 100, or in other words, when a user does not continue to treat the robot 100 kindly, the user cannot maintain an intimate relationship with the robot 100.

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Actions of the robot 100 are classified below in accordance with familiarity.

1. A cluster with extremely high familiarity

The robot 100 strongly expresses a feeling of affection by approaching a user (hereafter called an approaching action), and performing an affectionate gesture defined in advance as a gesture indicating goodwill toward a person.

2. A cluster with comparatively high familiarity

The robot 100 carries out only an approaching action.

3. A cluster with comparatively low familiarity

The robot 100 does not carry out any special action.

4. A cluster with particularly low familiarity

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, the user B can perceive that the robot 100 is shy and feeling uneasy, and relying on the user B. Owing to this kind of behavioral expression, pleasure at being chosen and relied upon, and an accompanying feeling of affection, are evoked in the user B.

Meanwhile, when the user A, who is a visitor, visits frequently, and speaks to and touches the robot 100, familiarity of the robot 100 toward the user A gradually rises, and the robot 100 ceases to perform an action of shyness (a withdrawing action) with respect to the user A. The user A can also feel affection toward the robot 100 by perceiving that the robot 100 has become accustomed to the user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

Coolness Seeking Function

The robot 100 is such that a heat generating member such as the CPU is cooled by external air being taken in. The lower an external air temperature, the more easily a heat generating member is cooled, and the operating level of a device such as a fan that forcibly causes air to circulate can be restricted. In general, when the operating level of a cooling device rises, the rotational speed of the fan increases, and noise increases. Noise when cooling causes the robot 100, which emulates animal-like behavioral characteristics, to feel the presence of a "machine", and is preferably suppressed as far as possible. Therefore, the robot 100 in this embodiment includes a function of moving to a cool place of its own volition, so as to reduce as far as possible mechanical noise generated for cooling.

Figure 6:
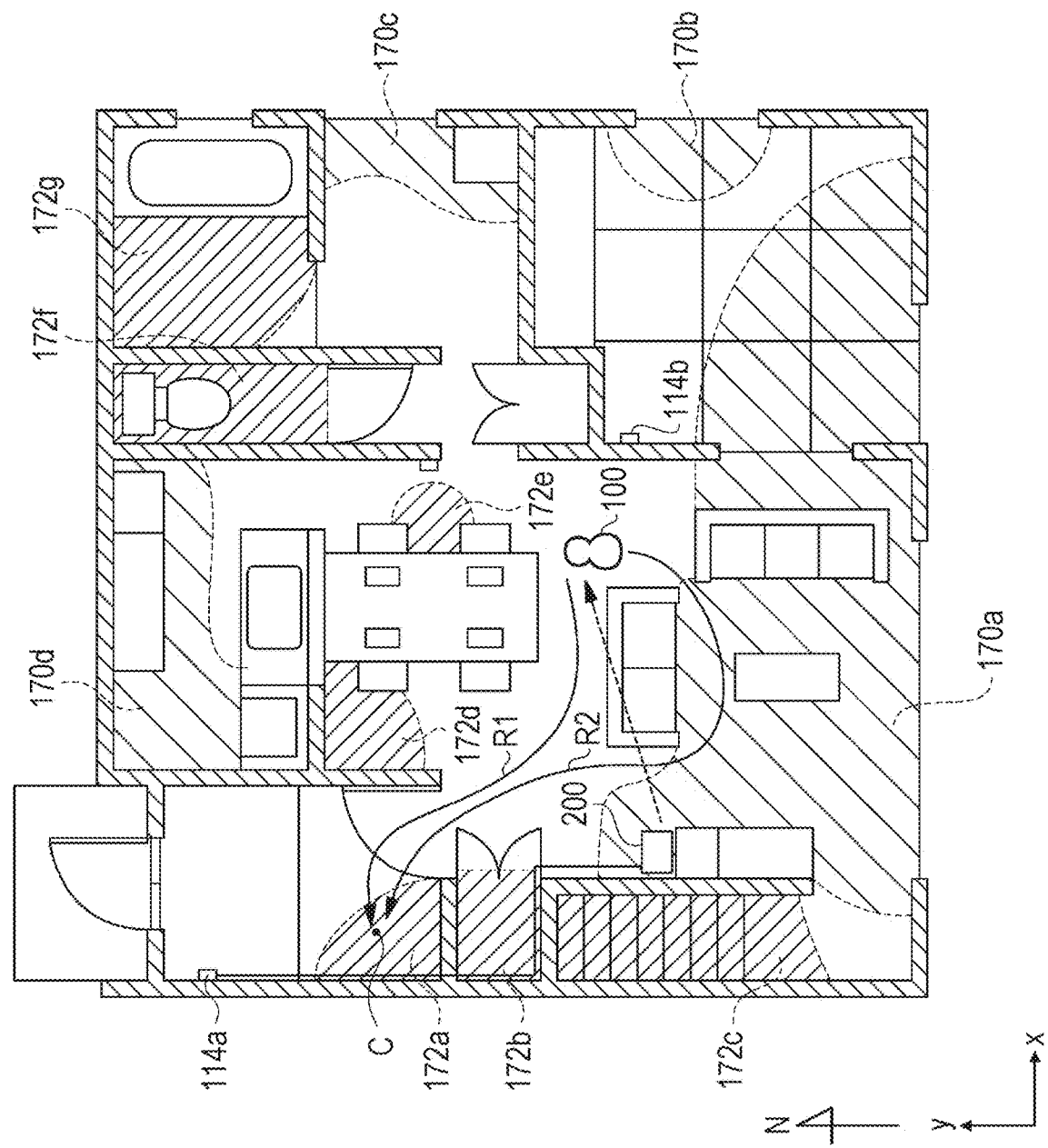
FIG. 6 is a schematic view for describing a function of the robot seeking coolness.

FIG. 6 is a schematic view for describing the function of the robot 100 seeking coolness.

The range over which the robot 100 can move in this embodiment is the whole of the inside of a home shown in FIG. 6. The external sensor 114 is installed in various portions inside the home. The robot 100 regularly measures room temperature (the peripheral temperature) when moving inside the home. The temperature map managing unit 226 compiles a temperature map showing a peripheral temperature distribution in the range over which the robot 100 can move by correlating the room temperature and the positional coordinates of the measurement point. The temperature map is information in which room temperature and positional coordinates are correlated, and a high temperature region 170 and a low temperature region 172 are identified by the temperature map. The high temperature region 170 is a region in which the room temperature is equal to or greater than a threshold M1, and the high temperature region 170 is a region in which the room temperature is less than a threshold M2 (M2≤M1).

In this embodiment, the high temperature region 170 is a region of 25 degrees Celsius or higher, and the low temperature region 172 is a region of less than 15 degrees Celsius. In FIG. 6, a multiple of high temperature regions 170a to 170d and a multiple of low temperature regions 172a to 172g are detected.

The high temperature region 170 is conceivably, for example, beside a window, or near a heat generating body such as an electrical appliance. The low temperature region 172 is conceivably a place exposed to air from an air conditioner, behind an object, or the like.

The robot 100 has behavioral characteristics of liking the low temperature region 172 and avoiding the high temperature region 170. When the internal temperature rises, the robot 100 searches for a point where the room temperature is lower than at the current point in order to lower the temperature. Specifically, the robot 100 (server 200), based on the temperature map, specifies a cool point C, where the room temperature is presumed to be lower than at the current point, as a movement target point.

The cool point C is desirably a point that is in the low temperature region 172a, and where the room temperature is particularly low. The movement determining unit 234 of the server 200 may specify an arbitrary point in the nearest low temperature region 172 as the cool point C, or may specify the nearest point from the current point that is at a predetermined room temperature or lower as the cool point C. Alternatively, the movement determining unit 234 may specify the point on the temperature map with the lowest room temperature as the cool point C. It is sufficient that the cool point C is at least a point where the room temperature is lower, or where the room temperature is presumed to be lower, than at the current point.

The movement determining unit 234 of the server 200 specifies a multiple of movement routes that head toward the cool point C. Two movement routes, those being a route R1 and a route R2, are specified in FIG. 6. The route R2 passes through the high temperature region 170a, but the route R1 does not pass through the high temperature region 170. In this case, the movement determining unit 234 selects the route R1, which is of the lower temperature. This is in order to restrict a rise in internal temperature as far as possible, even when the robot 100 is moving.

The movement determining unit 234 may select a movement route in which an average value of room temperatures at each predetermined interval is low. When the room temperatures of each one meter in a three meter movement route are 25 degrees, 22 degrees, and 27 degrees, the average value thereof, which is 25 degrees, may be specified as the room temperature (hereafter called "route temperature") of the movement route. Alternatively, the movement determining unit 234 may specify a maximum room temperature or a minimum room temperature in a movement route as the route temperature. When the route temperatures of a multiple of movement routes are the same, or when a difference between route temperatures is equal to or less than a predetermined threshold, the movement determining unit 234 may select the shorter movement route.

The server 200 notifies the robot 100 of the movement target point (cool point C) and the route R1 for the movement target point, and the robot 100 heads toward the cool point C along the route R1.

As the robot 100 incorporates a heat generating body such as the processor 122, the temperature in the interior of a frame of the robot 100 (the internal temperature) is liable to rise above room temperature. Although the robot 100 may expel heat by the incorporated fan being caused to rotate, in the same way as a general computer, the robot 100 can also lower the internal temperature by autonomously heading toward the cool point C. This is an advantage peculiar to an autonomously acting robot. Moreover, according to this kind of control method, animal-like behavioral characteristics of "not liking the heat" can be expressed.

Figure 7:
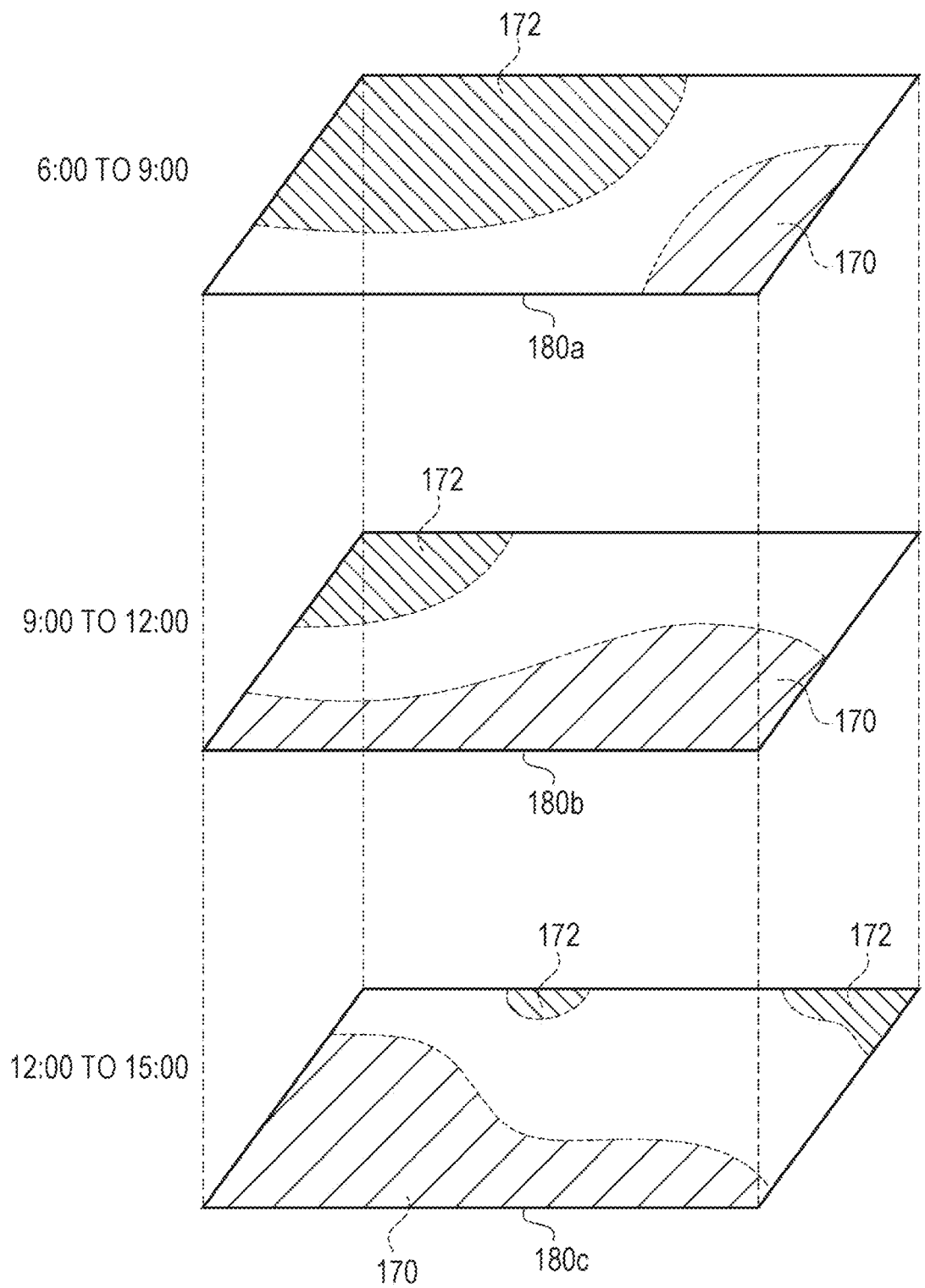
FIG. 7 is a schematic view for describing temporal change of a temperature map.

FIG. 7 is a schematic view for describing temporal change of a temperature map.

The room temperature changes depending on the time. FIG. 7 shows a temperature map 180 in three time bands, those being a temperature map 180*a* of 6.00 a.m. to 9.00 a.m., a temperature map 180*b* of 9.00 a.m. to 12.00 p.m., and a temperature map 180*c* of 12.00 p.m. to 3.00 p.m.

The robot 100 regularly measures the room temperature. The temperature map managing unit 226 records a measurement time and date correlated to the room temperature and the measurement point. For example, when the room temperature is measured between 6.00 a.m. and 9.00 a.m., the temperature map managing unit 226 updates the temperature map 180*a*. In the same time band, when the room temperature is measured multiple times at the same point, the latest room temperature may be recorded on the temperature map 180, or the average room temperature of the room temperature measured multiple times may be recorded.

According to FIG. 7, the low temperature region 172 is larger than the high temperature region 170 in the temperature map 180*a*, but the high temperature region 170 increases in size as time proceeds from the temperature map 180*b* to the temperature map 180*c*. According to the multiple of temperature maps 180, information such that the room temperature beside a south window increases during the day, and it is always cool behind a sofa, is obtained.

The robot system 300 can specify the cool point C appropriately by referring to the temperature map 180 in accordance with the time band of a movement starting point.

Figure 8:
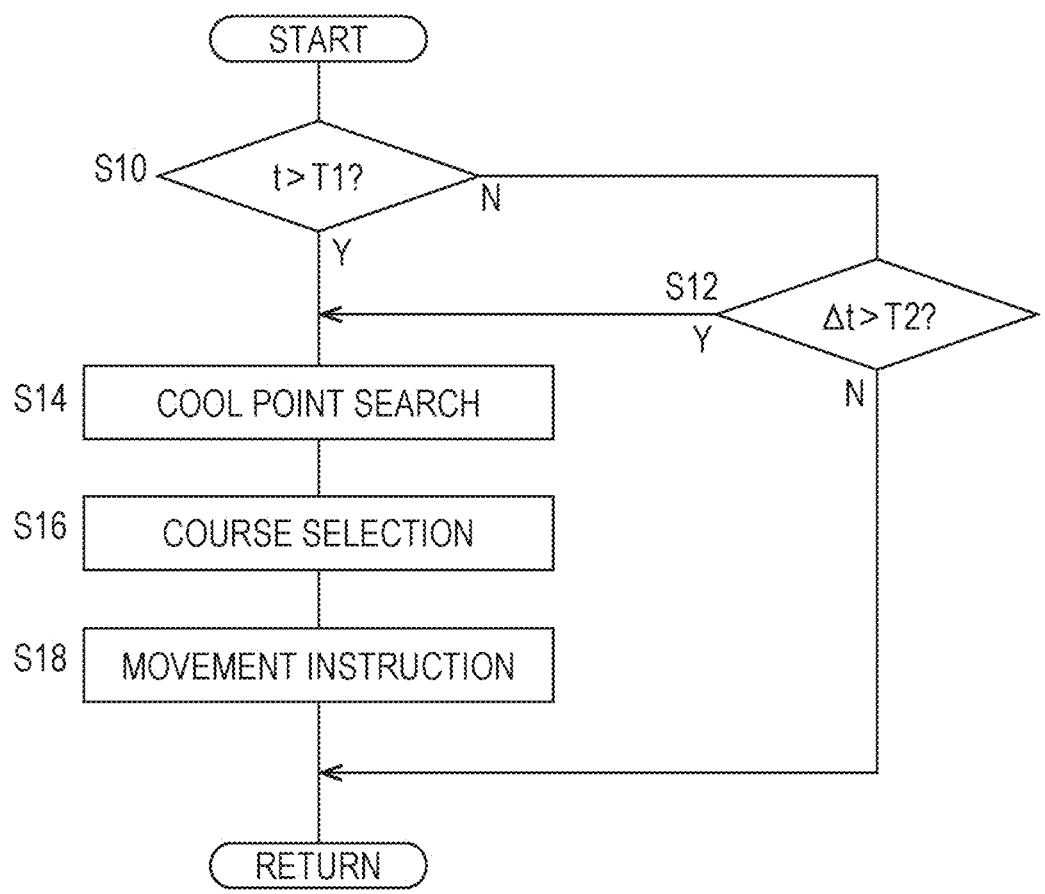
FIG. 8 is a flowchart showing a process of the robot heading toward a cool point.

FIG. 8 is a flowchart showing a process of the robot 100 heading toward the cool point C.

The internal sensor 128 regularly measures the internal temperature of the robot 100. The process shown in FIG. 8 is repeatedly executed at a timing of measuring the internal temperature. When an internal temperature t is greater than a predetermined threshold T1 (Y in S10), the movement determining unit 234 searches for the cool point C by referring to the temperature map 180 (S14).

Even when the internal temperature t is equal to or less than the threshold T1 (N in S10), the movement determining unit 234 also searches for the cool point C (S14) when a change rate Δt of the internal temperature is greater than a predetermined threshold T2 (Y in S12). The change rate of the internal temperature may be defined as a rate of temperature rise in a predetermined period, for example, every five seconds. This is because when the rate of temperature rise is high, it is predicted that cooling will soon be needed, even though the internal temperature t is low at this point in time.

The movement determining unit 234 sets the cool point C as a movement target point, and determines a movement route for reaching the cool point C (S16). When the movement target point and the movement route are determined, the movement determining unit 138 of the robot 100 issues a movement instruction to the movement drive unit 144 (S18).

When the internal temperature t is equal to or lower than the threshold T1 (N in S10), and the change rate Δt of the internal temperature is equal to or less than the threshold T2 (N in S12), the robot 100 does not move to the cool point C.

Actual behavioral characteristics of the robot 100 are a little more complex. When the favored point P1 with the large z value exists in the emotion map 116 described in connection with FIG. 4, the robot 100 may select the favored point P1 rather than the cool point C as a movement target point, even though the internal temperature t is high. When the internal temperature t is particularly high, the robot 100 may head toward the cool point C even though the favored point P1 with the large z value exists.

When a cool, dark place exists, and the robot 100 has a characteristic of not liking dark places, a behavioral characteristic of avoiding dark places and a behavioral characteristic of seeking a cool place conflict. When the internal temperature is extremely high, an incentive for seeking a cool place is stronger than an incentive for avoiding dark places. A movement target point of the robot 100 is determined based on a multiple of action maps, including the temperature map 180, and various parameters such as internal temperature and familiarity.

FIG. 8 is a flowchart schematically showing movement characteristics based on only the temperature map 180 of the multiple of action maps.

Heretofore, the robot 100 and the robot system 300 including the robot 100 have been described based on an embodiment.

The robot 100 performs an action selection that cannot be patterned using one or more action maps, and which is difficult to predict and animal-like. Using this kind of method, the robot 100 emulates animal-like action selection.

Actions of an animal are affected by various factors, but room temperature is one thereof. When body temperature rises, an animal attempts to restrict the rise in body temperature by moving to shade, or the like. When the internal temperature rises, particularly the temperature in a vicinity of a heat generation source such as the battery 118 or the processor 122, the robot 100 in this embodiment also autonomously moves in search of the cool point C. Because of this, animal-like behavioral characteristics can be expressed by the robot 100.

Also, it may happen that a failure such as a stoppage of the processor 122 or a destruction of data in the memory (storage device 124) occurs in the computer when the temperature is high. When lowering the internal temperature using a cooling device such as a fan, noise increases when the operating level of the cooling function increases. Noise when cooling causes the robot 100, which emulates animal-like behavioral characteristics, to feel the presence of a "machine", because of which the robot 100 may fall into ill humor. Meanwhile, the robot 100 has the characteristic of autonomous action. By the robot 100 moving to the cool point C of its own volition, cooling that does not rely excessively on a cooling device can be carried out. This kind of control method also contributes to energy saving by the robot 100.

The invention not being limited to the heretofore described at least one embodiment or a modified example, components can be changed or embodied without departing from the scope of the disclosure. Various implementations may be formed by a multiple of the components disclosed in the heretofore described at least one embodiment or the modified example being combined as appropriate. Also, some components may be eliminated from the total of components shown in the heretofore described at least one embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 5 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

In this embodiment, a description has been given assuming that the temperature map managing unit 226 compiles and updates the temperature map 180 by the robot 100 measuring the room temperature as appropriate, but the temperature map 180 may be set in advance in the server 200 as "innate and unchangeable preliminary knowledge". A multiple of temperature maps 180 corresponding to multiple kinds of time band may be initially set in the map storage unit 216.

In the same way, one or more cool points C may be initially set in advance in the server 200 as "innate knowledge". For example, behind a sofa or a bedroom may be set in advance as the cool point C. The robot 100 may perform an action assuming the cool point C decided in this way to be "a point with a lower temperature than the current point".

The robot 100 may search for the cool point C by itself, without referring to the temperature map 180. For example, the robot 100 may measure the peripheral temperature using a thermosensor, and identify a point with the lowest peripheral temperature as the cool point C.

A description has been given assuming that the robot 100 incorporates a fan for lowering the internal temperature. The robot 100 may measure the operating level of the fan, specifically the rotational speed and rotation time of the fan, and move to the cool point C when the operating level reaches a predetermined threshold or higher, or when it is assumed that the operating level will reach the predetermined threshold or higher. The robot 100 may assume that the operating level will increase when the rate of change of the operating level of the fan is high, or may assume that the operating level will increase when a process with a large load is due to be executed. When a process with a large load is due to be executed, it can be assumed that the internal temperature will rise.

The cooling mechanism 162 not being limited to a fan, it is sufficient that the mechanism discharges air in the interior of the robot 100, and takes in external air.

As a user turns off the cooler when going out, it is thought that the room temperature will rise. Because of this, the robot 100 may assume that the internal temperature will rise when a user goes out. When having innate or experience-based knowledge that the temperature of a room is highest at 2.00 p.m., the robot 100 may move to the cool point C before 2.00 p.m. is reached. In this way, the robot 100 may predict a timing at which the internal temperature reaches a predetermined temperature or higher based not only on the rate of change of the internal temperature, but also on innate or experience-based knowledge.

When the return home of a user is detected by the external sensor 114 on a midsummer day, the robot 100 may approach the user. This is because the robot 100 can expect that the user who has returned home will turn on the cooler. Also, by performing a gesture of looking between the user and the cooler, or the like, when it is hot, the robot 100 may ask the user to turn on the cooler.

A time band of the temperature map 180 may be defined based not only a time in one day, but also on a date or a season. For example, the temperature map 180 of 9.00 a.m. to 12.00 p.m. on June $7^{th}$ may be prepared separately from the temperature map 180 of 9.00 a.m. to 12.00 p.m. on June $6^{th}$. The cool point C is more easily specified more accurately by the temperature map 180 corresponding to various time bands being prepared. A multiple of temperature maps 180 may be prepared in accordance not only with time bands, but also weather such as sunshine, cloud, or rain. The server 200 may acquire weather information by being connected to a weather forecast site.

The robot 100 may pass swiftly past a high temperature point on the movement route toward the cool point C, and pass slowly past a low temperature point.

The server 200 estimates the route temperature of each movement route based on the temperature map 180. Further, the server 200 selects a movement route with a low route temperature with priority. Herein, "selecting with priority" may mean selecting with a higher probability the lower the route temperature of the movement route.

When a multiple of the robot 100 exist, a temperature map may be shared.

The external sensor 114 may incorporate a temperature sensor. Further, the temperature map managing unit 226 may form and update the temperature map 180 in accordance with temperature information obtained from the multiple of external sensors 114.

Figure 9:
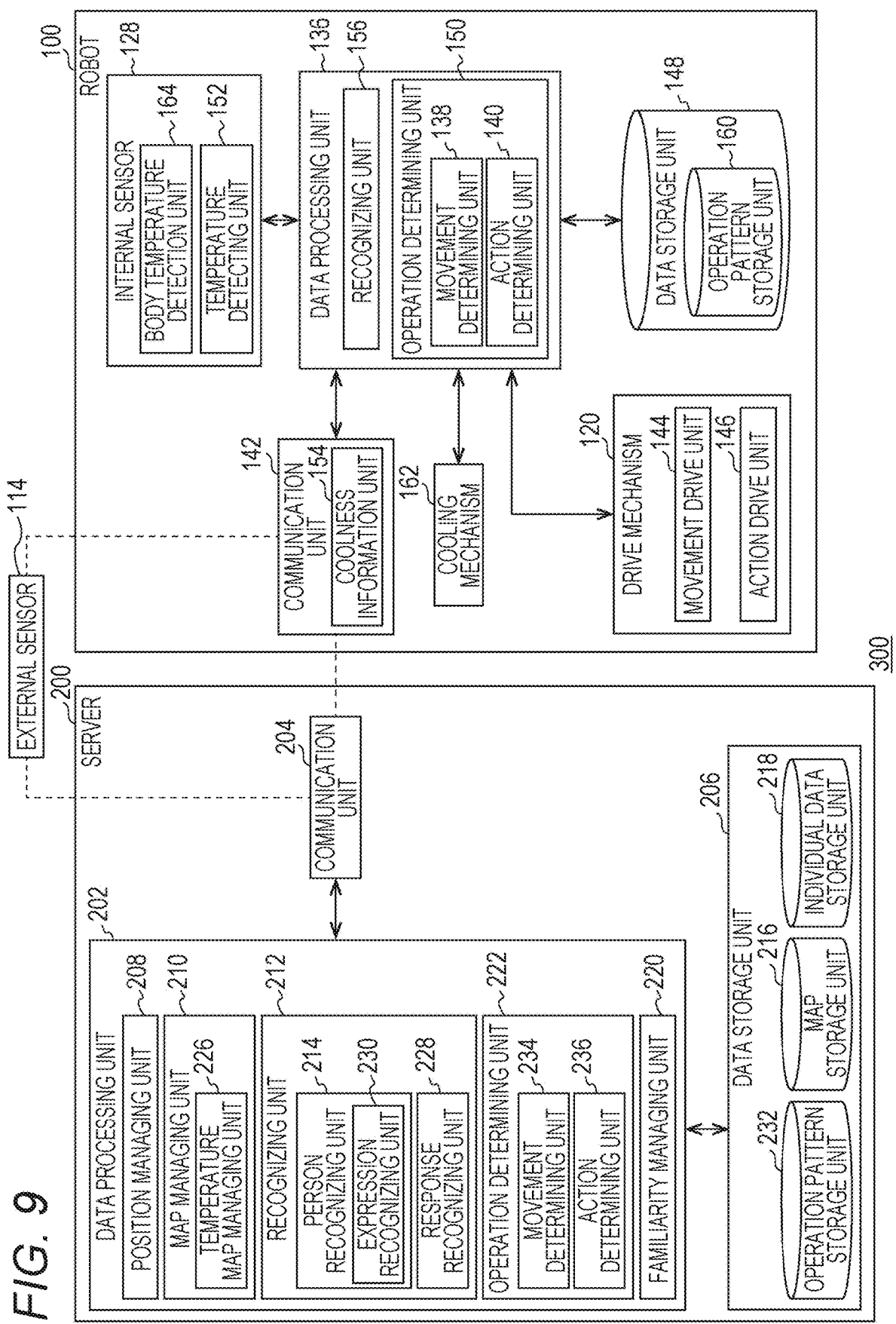
FIG. 9 is a functional block diagram of the robot system in a modified example.

FIG. 9 is a functional block diagram of the robot system 300 in a modified example.

In the robot system 300 of a first modified example, the communication unit 142 includes a coolness information unit 154. The coolness information unit 154 carries out a "coolness report", to be described hereafter, with respect to another robot. The internal sensor 128 includes a body temperature detection unit 164. The body temperature detection unit 164 detects the temperature (body temperature) of a user or another robot. The body temperature detection unit 164 includes a non-contact temperature sensor such as a radiation thermometer or thermography, and a contact temperature sensor such as a thermistor, a resistance temperature detector, a thermocouple, or an IC temperature sensor. The temperature detection unit 152 may also perform the function of the body temperature detection unit 164.

The robot 100 has a multiple of operation patterns (motions). Various motions, such as waving the arm 106, approaching an owner while winding, and looking closely at an owner with the head to one side, are defined.

The operation pattern storage unit 232 stores a "motion file" that defines control details of a motion. Each motion is identified by motion ID. The motion file is also downloaded into the operation pattern storage unit 232 of the robot 100. Which motion is to be executed may be determined by the server 200, or may be determined by the robot 100.

Many motions of the robot 100 are configured as compound motions that include a multiple of unit motions. For example, when the robot 100 approaches an owner, the motion may be expressed as a combination of a unit motion of changing direction toward the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in the motion file. Various motions are expressed by each actuator being controlled together with the passing of time in accordance with the motion file (actuator control information).

A shift time for changing from a preceding unit motion to a subsequent unit motion is called an "interval". It is sufficient that an interval is defined in accordance with time needed fora unit motion change or details of a motion. A length of an interval can be regulated.

Hereafter, settings involved in controlling an action of the robot 100, such as which motion is chosen and when, and output regulation of each actuator when realizing a motion, will collectively be called "action properties". The action properties of the robot 100 are defined by a motion selection algorithm, a motion selection probability, a motion file, and the like.

The robot 100 has, in addition to an action map, parameters that indicate a magnitude of various emotions or senses. For example, when a value of a loneliness emotion parameter is increasing, a weighting coefficient of an action map that evaluates places in which the robot 100 feels at ease is set high, and the value of this emotion parameter is reduced by the robot 100 reaching a target point. In the same way, when a value of a parameter indicating a sense of boredom is increasing, it is sufficient that a weighting coefficient of an action map that evaluates places in which curiosity is satisfied is set high.

When the recognizing unit 156 detects a moving object such as a person or a pet, the body temperature detecting unit 162 measures the body temperature of the moving object. When the body temperature of the moving object is a predetermined value or higher, for example, 37 degrees or higher, the movement determining unit 234 of the server 200 (or the movement determining unit 138 of the robot 100) sets a cool point specified based on the temperature map 180 as a movement target point. Also, the action determining unit 236 of the server 200 (or the action determining unit 140 of the robot 100) selects a motion (hereafter called a "coolness guiding motion") correlated in advance to the moving object in accordance with the heretofore described conditions, and causes the action drive unit 146 to execute the motion. It is sufficient that the coolness guiding motion is a specific motion defined in order to lead the moving object to a cool point, such as waving the arm 106, heading in the direction of the cool point after directing the body 104 toward the moving object, directing the arm 106 in the direction of the cool point, moving to the cool point while looking back at the moving object, or lingering at the cool point. The coolness guiding motion is desirably a motion such that the moving object is interested and wants to approach. According to this kind of control method, heatstroke is easily prevented by leading a person or pet whose body temperature is rising to a cool point.

Multiple kinds of coolness guiding motion may be defined in accordance with user attributes. For example, when the user is a child, the operation determining unit 150 may cause the robot 100 to execute a coolness guiding motion of escaping to a cool point after touching the user. The user (child) is led to the cool point by chasing after the robot 100. When the user is an adult, the operation determining unit 150 may cause the robot 100 to execute a coolness guiding motion of touching the user with the arm 106, pointing to a cool point with the arm 106, or the like. The operation determining unit 150 may select a coolness guiding motion based not only on the age of a user, but also on another attribute (parameter) such as gender or familiarity.

The recognizing unit 212 may manage a coolness guiding motion correlated with a success or failure thereof as history information. For example, when executing a coolness guiding motion M1, the recognizing unit 212 determines that the coolness guiding motion M1 has succeeded when a user P1 moves to a cool point, and updates a success rate of the user P1 and the coolness guiding motion M1. The operation determining unit 150 may select a coolness guiding motion by referring to the history information. Specifically, when wishing to guide the user P1 to a cool point, it is sufficient that the operation determining unit 150 selects a coolness guiding motion with a high success rate for the user P1. When the guiding fails at this time, it is sufficient that the operation determining unit 150 attempts once more to guide by selecting the coolness guiding motion with the next highest success rate.

The body temperature detection unit 164 may regularly measure the body temperature of each moving object, and the communication unit 142 may notify the server 200 of the measured body temperature. Further, the recognizing unit 212 may record the average body temperature of each moving object by registering the measured body temperature in the individual data storage unit 218. When a difference between the measured body temperature of a moving object and the average body temperature of the moving object is a predetermined value or greater, the operation determining unit 222 of the server 200 (or the operation determining unit 150 of the robot 100) may set a cool point as a movement target point, and select a coolness guiding motion. Alternatively, when the peripheral temperature of a moving object is a predetermined temperature or higher, the operation determining unit 150 may select a coolness guiding motion.

When the recognizing unit 156 detects another robot R1 too, the body temperature detection unit 164 measures the body temperature (radiation temperature) of the robot R1. The robot R1 in this case may be of the same type as the robot 100, or may be of a type that does not include a function of heading for a cool point. The recognizing unit 212 of the server 200 (or the recognizing unit 156 of the robot 100) may recognize a moving object having a form differing from that of a person or a pet as a "robot". Alternatively, the recognizing unit 212 (or the recognizing unit 156) may recognize another robot by detecting an ID signal regularly transmitted from the robot R1 using an unshown sensor.

The recognizing unit 156 is such that when the body temperature (radiation temperature) of the robot R1, measured from radiated heat, is of a predetermined value or higher, the coolness information unit 154 transmits coolness information, or more specifically, a signal specifying coordinates of a cool point (hereafter called a "coolness signal"), to the robot R1. Provided that the robot R1 has a function of receiving a coolness signal from the robot 100 and moving to a cool point as specified by the coolness signal, the robot R1 can head for a cool point when the temperature is high, in the same way as the robot 100, even though the robot R1 does not have a function of finding a cool point by itself.

The average body temperature of the robot R1 is recorded, and when the difference between the measured body temperature and the average body temperature of the robot R1 is a predetermined threshold difference or greater, the coolness information unit 154 may transmit a coolness signal. Also, the coolness information unit 154 may transmit a coolness signal when the peripheral temperature of the robot R1 is a predetermined temperature or higher.

When the peripheral temperature regularly measured by the temperature detection unit 152 during movement is a predetermined threshold temperature or higher, for example, 30 degrees or higher, the action determining unit 140 may set the movement speed to be high. Alternatively, the action determining unit 140 may also set the movement speed of the robot 100 to be high when the peripheral temperature of the current point shown in the temperature map 180 during movement is a predetermined threshold temperature or higher. According to this kind of control method, time spent by the robot 100 in a high temperature region can be reduced as far as possible during movement too, because of which the internal temperature of the robot 100 is easily restricted. For the same kind of reason, the action determining unit 140 may reduce the movement speed when the peripheral temperature measured by the temperature detection unit 152, or the peripheral temperature of the current point shown in the temperature map 180, is a predetermined threshold temperature or lower, for example, 10 degrees or lower.

The recognizing unit 212 (or the recognizing unit 156) may recognize an image of an air conditioner installed indoors, or of a remote controller thereof. The matter that the air conditioner or the remote controller is installed may be registered in the robot 100 in advance. When the internal temperature of the robot 100 exceeds a threshold, or when a rate at which the internal temperature rises exceeds a threshold, the operation determining unit 222 (or the operation determining unit 150) may set a point directly below the air conditioner, or a point where the remote controller of the air conditioner exists, as a movement target point, or the robot 100 may move in the direction in which the air conditioner and the remote controller exist. When the recognizing unit 212 (or the recognizing unit 156) cannot detect a cool point, the operation determining unit (or the operation determining unit 150) may set a point directly below the air conditioner, or a point where the remote controller of the air conditioner exists, as a movement target point. By moving near to an air conditioner or the like, the robot 100 can make an unspoken appeal to a user meaning that the robot 100 wants the indoor temperature to be lowered.

The recognizing unit 156 may identify a cooling device such as an air conditioner based on a result of a detection by the temperature detection unit 152. For example, when there is a point in the temperature map 180 with a temperature that is noticeably low compared with the periphery, for example, a point that is one degree or more lower than the average indoor temperature, the recognizing unit 156 may determine that there is an air conditioner there. When positions of a multiple of air conditioners are registered in advance in the server 200 or the robot 100, the recognizing unit 156 may search for an air conditioner near the current point from the registered information.

Not being limited to an air conditioner, the robot 100 may set a movement target point with another cooling device, such as a fan, as a target. Also, as this kind of appeal is meaningless when no user (person) is present, the robot 100 may move to a cooling device only when the recognizing unit 156 recognizes a user. The robot 100 may ask a user to use a cooling device not only by moving to the cooling device, but also by the operation determining unit 140 directing the arm 106 toward the cooling device.

When a fan is operating when the internal temperature is high, or when the rate of a rise in the internal temperature is high, the operation determining unit 150 may set a movement target point in front of the fan. The recognizing unit 212 (or the recognizing unit 156) may determine a position of the fan and an operating state thereof by recognizing an image of the fan and a rotation of a blade thereof. According to this kind of control method, not only can the internal temperature be lowered by utilizing an external cooling device such as a fan, but also an animal-like characteristic of wanting to go near a fan because it is hot can be expressed by action. The communication unit 142 of the robot 100 can independently cause a cooling device to operate by transmitting a control signal to an air conditioner or a fan.

When the internal temperature rises, or when the rate of a rise in the internal temperature is high, the cooling mechanism 162 is such that the rotational speed of the fan is increased. However, noise is generated when the rotational speed of the fan increases. The sound of the fan rotating not only causes noise, but also causes a user to feel that the robot 100 is a "machine", which is undesirable in terms of the concept of animal-like characteristics. When the internal temperature is high, or when the rotational speed of the fan is high, the movement determining unit 234 (or the movement determining unit 138) may set a direction of movement in a direction away from a user. When a multiple of users exist, or more specifically, when a multiple of users are recognized from an image filmed by the camera, the movement determining unit 234 (or the movement determining unit 138) may set a point distanced from any of the multiple of users as a movement target point. According to this kind of control method, the rotational speed of the fan can be increased after the robot 100 moves sufficiently far from a user, because of which the sound of the fan can be rendered difficult for a user to hear.

For the same kind of reason, when the robot 100 is within a predetermined range from a user, or when a user is being filmed, the cooling mechanism 162 is such that an upper limit value may be set for the rotational speed of the fan. Importance may be given to quietness by providing an upper limit value for the rotational speed of the fan when a user is nearby, and importance may be given to cooling performance by removing the upper limit value restriction on the rotational speed of the fan when no user is nearby. A first upper limit value T1 and a second upper limit value T2 (>T1) may be registered in advance for the rotational speed of the fan. The cooling mechanism 162 is such that the first upper limit value T1 may be set when the recognizing unit 156 recognizes a user, and the second upper limit value T2 may be set when no user is recognized. Also, the robot 100 may measure the distance between a user and the robot 100 using an already known distance measuring device, and set the upper limit value of the rotational speed to be higher the greater the distance. Also, even when the robot 100 is beside a user, the movement determining unit 234 may set a point distanced from the user as a movement target point, and then remove the upper limit value of the rotational speed of the fan, when the internal temperature of the robot 100 rises particularly high.

An indoor temperature distribution may be measured using a thermosensor installed indoors, for example, fixed to a ceiling. The temperature map managing unit 226 may regularly receive temperature distribution information from the thermosensor, and update the temperature map 180.

When the internal temperature of the robot 100 is a predetermined value or higher, the movement determining unit 234 of the server 200 may set the high temperature region 170 to be a region through which passing is prohibited.

When the internal temperature is a predetermined value or higher, or when the indoor temperature is a predetermined value or higher, the action determining unit 140 of the robot 100 may appeal to a user to cause a cooling device to operate by directing the arm 106 toward a cooling device such as an air conditioner or a fan. Alternatively, the movement determining unit 138 of the robot 100 may instruct the movement drive unit 144 to cause the robot 100 to approach a cooling device, or the action determining unit 140 may cause the robot 100 to alternately execute a motion of directing the body 104 toward a user and a motion of directing the body 104 toward a cooling device. Not being limited to a cooling device, the same kind of motion may be executed with a refrigerator as a target, or attention may be attracted by hitting a window with the arm 106.

As heretofore described, the temperature map 180 may be shared by a multiple of robots 100. For example, it is assumed that the temperature map 180 is formed based on a temperature measuring function of a robot 100A. At this time, the temperature map managing unit 226 of the server 200 may provide another robot 100B with a right of access to the temperature map 180. Also, the operation determining unit 222 of the server 200 may control both the robot 100A and the robot 100B based on the same temperature map 180. According to this kind of control method, the robot 100B can select an action based on temperature distribution in the same way as the robot 100A, even though the robot 100B does not have a function of forming the temperature map 180.

When the internal temperature is a predetermined value or higher, or when the indoor temperature is a predetermined value or higher, the robot 100 may execute various motions to appeal that "it's hot". For example, when the robot 100 is wearing clothing, the action determining unit 140 of the robot 100 may cause the robot 100 to execute a motion of wanting to take off the clothing, for example, a motion of hitting a button of the clothing with the arm 106. In addition to this, the action determining unit 140 may cause the robot 100 to execute a motion of fanning the face by moving the arm 106 like a fan, or the movement determining unit 138 may cause the robot 100 to express by action "lethargy caused by heat" by executing a motion of moving while staggering.

The cooling mechanism 162 is such that the rotational speed of the fan may be increased when no person (user) is detected in the periphery, thereby reducing the internal temperature to a predetermined value, for example, 15 degrees or lower, and the rotational speed or operating time of the fan may be restricted when a person is detected. Also, other than a fan, a heat source such as the processor 122 may be cooled using a quiet Peltier element. The cooling mechanism 162 is such that when the rotational speed of the fan reaches a predetermined upper limit value, a heat source may be cooled using a Peltier element instead of a fan, or in addition to a fan. In the same way, the cooling mechanism 162 may be such that a heat source is cooled using a Peltier element when a user exists in the periphery, and a heat source is cooled using a fan when no user exists in the periphery, that is, when no person appears in an image filmed by the incorporated camera. According to this kind of control method, cooling performance can be enhanced, and quietness can be increased.

A cool point may be set at a place not exposed to direct sunlight, such as shade or beside a door. The recognizing unit 156 of the robot 100 may detect a "dark place" where illumination is of a predetermined value or less using a light sensor, and the operation determining unit 150 may set the "dark place" as a cool point. Also, the recognizing unit 156 of the robot 100 may detect a "place exposed to wind" from a cooling device or from outside using a wind direction sensor. Further, the operation determining unit 150 may set the "place exposed to wind" as a cool point.

Also, when a fan is caused to rotate or a Peltier element is caused to operate, the action determining unit 140 of the robot 100 may cause the robot 100 to perform an action suggesting that cooling is in progress. For example, the action determining unit 140 may cause the robot 100 to perform a characteristic action specified in advance, such as slowly raising and lowering the arm 106 in a sitting state.

As heretofore described, action properties of the robot 100 change based on various external and internal factors. For example, when a user with high familiarity exists, momentum of wanting to approach the user is generated. Meanwhile, when the internal temperature is high, momentum of wanting to move away from a user and drive a fan, thereby reducing the internal temperature, or momentum of wanting to head toward a cool point is generated. The operation determining unit 222 (or the operation determining unit 150 of the robot 100) may compare familiarity and internal temperature and, for example, give priority to an approaching action based on familiarity when the internal temperature is 30 degrees or less, and give priority to moving to a cool point when the internal temperature exceeds 30 degrees. In this way, the operation determining unit 222 can change the action properties of the robot 100 by selecting various momentums in accordance with a strength thereof.

What is claimed is:

1. An autonomously acting robot, comprising:
   a non-transitory computer readable medium configured to store instructions thereon;
   a processor connected to the non-transitory computer readable medium, wherein the processor is configured to execute the instructions for:
   determining a cool point as a movement target point, wherein the cool point is a location having an ambient temperature lower than an ambient temperature at a current location of the autonomously acting robot;
   selecting a route from a plurality of routes from the current location to the movement target point, wherein the selecting the route comprises selecting a route assumed to have a lowest average temperature of the plurality of routes;
   specifying a direction of movement along the selected route; and
   a drive mechanism configured to execute the specified movement.

2. The autonomously acting robot according to claim 1, further comprising a sensor configured to detect an ambient temperature surrounding the autonomously acting robot, wherein
the processor is configured to determine the cool point based on the detected ambient temperature.

3. The autonomously acting robot according to claim 1, wherein processor is configured to determine the cool point by referring to a temperature map showing an ambient temperature distribution in a range in which the robot is movable.

4. The autonomously acting robot according to claim 3, further comprising:
a sensor configured to detect an ambient temperature surrounding the autonomously acting robot, wherein
the processor is configured to generate the temperature map based on the detected ambient temperature.

5. The autonomously acting robot according to claim 4, wherein the processor is configured to generate the temperature map in association with a time of day the ambient temperature is detected.

6. The autonomously acting robot according to claim 1, wherein the processor is configured to determine the cool point as the movement target point in response to an internal temperature of the autonomously acting robot being a predetermined value or higher.

7. The autonomously acting robot according to claim 1, wherein the processor is configured to determine the cool point as the movement target point in response to an internal temperature of the autonomously acting robot being predicted to reach or exceed a predetermined value.

8. The autonomously acting robot according to claim 1, wherein the processor is configured to determine the cool point as the movement target point in response to an operating level of a cooling function in an interior of the autonomously acting robot reaching or exceeding a predetermined value.

9. The autonomously acting robot according to claim 8, further comprising a cooling mechanism configured to adjust a rotational speed of a fan based on an internal temperature of the autonomously acting robot, wherein
the processor is configured to specify the direction of movement in a direction away from a user in response to the rotational speed of the fan reaching or exceeding a predetermined rotation speed.

10. The autonomously acting robot according to claim 9, wherein the cooling mechanism is configured to set an upper limit value of the rotational speed of the fan to be lower in response to the user being within a predetermined distance from the autonomously acting robot.

11. The autonomously acting robot according to claim 8, further comprising a cooling mechanism configured to adjust a rotational speed of a fan based on an internal temperature of the autonomously acting robot, wherein
the processor is configured to specify the direction of movement in a direction away from a user in response to the rotational speed of the fan being predicted to reach or exceed a predetermined rotation speed.

12. The autonomously acting robot according to claim 1, wherein the processor is configured to determine the cool point as the movement target point in response to an operating level of a cooling function in an interior of the autonomously acting robot being predicted to reach or exceed a predetermined value.

13. The autonomously acting robot according to claim 1, further comprising a sensor configured to detect a body temperature of a moving object, wherein the processor is configured to instruct the drive mechanism to execute a predetermined motion for leading the moving object to the cool point in response to the detected body temperature of the moving object being a predetermined value or higher.

14. The autonomously acting robot according to claim 1, further comprising:
a sensor configured to detect a temperature of a second robot; and
a transmitter, wherein the processor is configured to instruct the transmitter to transmit the cool point to the second robot in response to the detected temperature of the second robot being a predetermined value or higher.

15. The autonomously acting robot according to claim 1, wherein the processor is configured to increase a movement speed of the drive mechanism in response to the autonomously acting robot passing through a region having a temperature higher than a predetermined threshold temperature.

16. The autonomously acting robot according to claim 1, further comprising a transmitter, wherein the processor is configured to instruct the transmitter to send a signal to an external cooling device for adjusting a direction of the external cooling device in response to a failure to determine the cool point.

17. An autonomously acting robot, comprising:
a non-transitory computer readable medium configured to store instructions thereon;
a processor connected to the non-transitory computer readable medium, wherein the processor is configured to execute the instructions for:
recognizing a cooling device or a controller for a cooling device;
recognizing a user;
specifying a movement for enticing the user to operate the cooling device or the controller for the cooling device in response to (1) an internal temperature of the autonomously acting robot reaching or exceeding a predetermined value or (2) the internal temperature of the autonomously acting robot being predicted to reach or exceed the predetermined value; and
a drive mechanism configured to execute the specified movement.

18. An autonomously acting robot, comprising:
a non-transitory computer readable medium configured to store instructions thereon;
a cooling mechanism configured to adjust a rotational speed of a fan based on an internal temperature of the autonomously acting robot;
a processor connected to the non-transitory computer readable medium, wherein the processor is configured to execute the instructions for:
specifying a direction of movement to be away from a user in response to (1) the rotational speed of the fan reaching or exceeding a predetermined rotation speed or (2) the rotational speed of the fan being predicted to reach or exceed the predetermined rotation speed;
a drive mechanism configured to execute the specified the movement.

19. The autonomously acting robot according to claim 18, wherein the cooling mechanism is configured to set an upper limit value of the rotational speed of the fan to be lower in response to the user being within a predetermined range from the autonomously acting robot.

20. An autonomously acting robot, comprising:
a non-transitory computer readable medium configured to store instructions thereon;
a sensor configured to detect a body temperature of a user;
a processor connected to the non-transitory computer readable medium, wherein the processor is configured to execute the instructions for:
specifying a movement for leading the user to a cool point in response to the detected body temperature being equal to or greater than a predetermined temperature, wherein the cool point is a location having an ambient temperature lower than an ambient temperature at a current location of the autonomously acting robot;
a drive mechanism configured to execute the specified movement.

* * * * *